US012693693B2

(12) United States Patent
Cockshott et al.

(10) Patent No.: US 12,693,693 B2
(45) Date of Patent: Jul. 28, 2026

(54) FLUID REGULATOR WITH IMPROVED PRESSURE CONTROL

(71) Applicant: Landis+Gyr Technology, Inc., Alpharetta, GA (US)

(72) Inventors: Antony Cockshott, Sydney (AU); Peter Whan, Sydney (AU)

(73) Assignee: LANDIS+GYR TECHNOLOGY, INC., Alpharetta, GA (US)

( * ) Notice: Subject to any disclaimer, the term of this patent is extended or adjusted under 35 U.S.C. 154(b) by 71 days.

(21) Appl. No.: 18/714,666

(22) PCT Filed: Dec. 16, 2021

(86) PCT No.: PCT/US2021/063911
§ 371 (c)(1),
(2) Date: May 30, 2024

(87) PCT Pub. No.: WO2023/113807
PCT Pub. Date: Jun. 22, 2023

(65) Prior Publication Data
US 2024/0393812 A1     Nov. 28, 2024

(51) Int. Cl.
G05D 16/04          (2006.01)
G05D 16/06          (2006.01)
(52) U.S. Cl.
CPC ..... G05D 16/0402 (2019.01); G05D 16/0672 (2013.01); *G05D 16/0655* (2013.01); *Y10T 137/7801* (2015.04)
(58) Field of Classification Search
CPC .......... G05D 16/0402; Y10T 137/7795; Y10T 137/7797; Y10T 137/7798; Y10T 137/781
See application file for complete search history.

(56) References Cited

U.S. PATENT DOCUMENTS

| 356,684 | A | * | 1/1887 | Firth | ...................... | G05D 16/12 |
| | | | | | | 137/505.31 |
| 2,688,975 | A | * | 9/1954 | Born | .................. | G05D 16/0655 |
| | | | | | | 251/364 |

(Continued)

FOREIGN PATENT DOCUMENTS

| JP | H11514460 A | 12/1999 |
| JP | 2000-132237 A | 5/2000 |
| WO | 9607129 A1 | 3/1996 |

OTHER PUBLICATIONS

International Search Report and Written Opinion for International application No. PCT/US2021/063911, dated Jul. 26, 2022, 11 pages.

(Continued)

*Primary Examiner* — Robert K Arundale
(74) *Attorney, Agent, or Firm* — Tarolli, Sundheim, Covell & Tummino LLP

(57)          ABSTRACT

A fluid regulator assembly for a fluid, such as a gas, includes a housing and a regulator. The housing includes an inlet, an outlet, and a chamber. The regulator is coupled to the housing and includes a control assembly with a plug, a diaphragm, and a control element. The plug is movable relative to the outlet for controlling a flow of fluid through the housing, and the diaphragm controls the plug responsive to a control pressure acting on the diaphragm. The control element is positionable between a first position and a second position for controlling the control pressure acting on the diaphragm, where, in the first position, the control pressure is an outlet pressure downstream from the outlet, and in the second position, the control pressure is at least an inlet pressure upstream from the outlet.

17 Claims, 7 Drawing Sheets

(56) References Cited

U.S. PATENT DOCUMENTS

| | | | | |
|---|---|---|---|---|
| 3,087,705 A | * | 4/1963 | Hamilton | F16K 39/022 |
| | | | | 251/282 |
| 3,392,749 A | * | 7/1968 | Gneiding | G05D 16/0672 |
| | | | | 137/484.6 |
| 3,777,777 A | * | 12/1973 | Katchka | G05D 16/0672 |
| | | | | 92/99 |
| 4,349,136 A | * | 9/1982 | Fallon | G05D 16/0663 |
| | | | | 222/400.7 |
| 5,755,254 A | | 5/1998 | Carter et al. | |
| 2001/0025656 A1 | * | 10/2001 | Hiddessen | G05D 16/107 |
| | | | | 137/505.18 |
| 2015/0361924 A1 | | 12/2015 | Kim et al. | |
| 2016/0281871 A1 | * | 9/2016 | Kobayashi | F02M 21/0239 |

OTHER PUBLICATIONS

Office Action for JP application No. 2024-535926, dated Oct. 14, 2025, 6 pages.

* cited by examiner

100

FLUID REGULATOR WITH IMPROVED PRESSURE CONTROL

FIELD OF THE INVENTION

This application relates to fluid regulators, such as gas regulators, and more particularly to fluid regulators including a diaphragm.

BACKGROUND

Fluid regulators are often provided to receive a fluid at an input pressure and supply the fluid at a desired output pressure, which may be substantially less than the input pressure. For example, a gas distribution system may supply gas according to various factors such as overall demand, climate, gas source, etc., and a gas regulator may be utilized to reduce the pressure of the gas supplied to end-users who may have gas appliances such as furnaces, ovens, etc. that require the gas to be delivered at a predetermined pressure below the capacity of the system.

Traditional fluid regulators have included either a full capacity relief valve or an over pressure shut-off (OPSO) device as safety features to minimize or prevent a fluid from flowing to the end-user in the event of the fluid regulator failing. While such devices provide protection to the end-user, they suffer from several problems. For example, full capacity relief valves release a large amount of gas into the environment, which may produce an explosive gas mixture and/or be a large release of a greenhouse gas OPSO devices are susceptible to false tripping which can be inconvenient and cause considerable maintenance costs to utility providers. For example, OPSO devices may suffer from false tripping due to high flow rates downstream (e.g., a number of valves are opened at once, a high flow valve is opened, etc.), which may cause a pressure spike that leads to the OPSO device shutting off gas to the consumer. Moreover, OPSO devices may be susceptible to false tripping if downstream valves or systems are installed too close to the regulator with the OPSO device and/or if sun light and/or other environmental conditions heat up the conduit carrying the gas.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a fluid regulator assembly for a fluid includes a housing with an inlet, an outlet, and a chamber between the inlet and the outlet and in fluid communication with the inlet and the outlet. A regulator is coupled to the housing and includes a control assembly with a plug, a diaphragm operably coupled to the plug, and a control element. The plug is movable relative to the outlet for controlling a flow of fluid through the housing, and the diaphragm is configured to control the plug responsive to a control pressure acting on the diaphragm. The control element is positionable between a first position and a second position for controlling the control pressure acting on the diaphragm where, in the first position, the control pressure is an outlet pressure downstream from the outlet, and in the second position, the control pressure is at least an inlet pressure upstream from the outlet.

According to some embodiments, a fluid regulator assembly for a fluid includes a housing with an inlet, an outlet, and a chamber between the inlet and the outlet and in fluid communication with the inlet and the outlet. The fluid regulator assembly also includes a regulator coupled to the housing. The regulator includes a control assembly with a plug, a diaphragm operably coupled to the plug, and a control element. The plug is movable relative to the outlet for controlling a flow of fluid through the housing. The control element is adjustable based on an inlet pressure upstream from the outlet such that, when the inlet pressure is at or below a predetermined threshold pressure, the diaphragm controls the plug responsive to an outlet pressure downstream from the outlet, and when the inlet pressure exceeds the predetermined threshold pressure, the diaphragm controls the plug responsive to the inlet pressure.

According to various embodiments, a fluid regulator assembly for a fluid includes a housing with a first chamber having a first chamber inlet and a first chamber outlet and that receives the fluid at an inlet pressure. The housing also includes a second chamber with a second chamber inlet and a second chamber outlet, and an intermediate passage connecting the first chamber outlet with the second chamber inlet. The fluid regulator assembly also includes a first regulator and a second regulator. The first regulator includes a first control assembly with a first plug and a first diaphragm operably coupled to the first plug. The first plug is movable relative to the first chamber outlet for controlling a flow of fluid through the first chamber outlet, and the first diaphragm is within the first chamber and is configured to position the first plug responsive to an intermediate pressure. The second regulator includes a second control assembly with a second plug, a second diaphragm operably connected to the second plug, and a control element. The second plug is movable relative to the second chamber outlet for controlling a flow of fluid through the second chamber outlet, and the second diaphragm is within the second chamber and is configured to position the second plug responsive to a control pressure. The control element is configured to control the control pressure responsive to the intermediate pressure and such that the control pressure is the intermediate pressure or an outlet pressure downstream from the second chamber outlet.

According to certain embodiments, a fluid regulator assembly for a fluid includes a housing with an inlet, a chamber, and an outlet. The fluid regulator assembly also includes a regulator at least partially within the chamber and that separates the chamber into an inlet pressure region at an inlet pressure and an outlet pressure region at an outlet pressure less than the inlet pressure. The regulator may regulate the fluid from the inlet pressure to the outlet pressure and control a fluid flow from the chamber through the outlet based on the outlet pressure. In some embodiments, the regulator selectively defines a flow path from the inlet pressure region to the outlet pressure region within the chamber responsive to the inlet pressure exceeding a predetermined threshold pressure.

According to various embodiments, a fluid regulator assembly for a fluid includes a housing, a first regulator, and a second regulator. The housing includes a first chamber with a first chamber inlet and a first chamber outlet, a second chamber with a second chamber inlet and a second chamber outlet, and an intermediate passage fluidly connecting the first chamber outlet with the second chamber inlet. The first regulator is at least partially within the first chamber and includes a first diaphragm and a first plug. The first diaphragm selectively positions the first plug to control a fluid flow from the first chamber to the intermediate passage through the first chamber outlet and regulate the fluid from an inlet pressure to an intermediate pressure. The second regulator is at least partially within the second chamber and includes a second diaphragm and a second plug. The second diaphragm selectively positions the second plug to control a fluid flow from the second chamber through the second chamber outlet and regulate the fluid from the intermediate pressure to an outlet pressure. In some embodiments, the second regulator includes a switching diaphragm between the second chamber inlet and the second chamber outlet that is selectively deformable responsive to the intermediate pressure exceeding a predetermined threshold pressure.

According to some embodiments, a fluid regulator assembly for a fluid includes a housing, a first regulator, and a second regulator The housing includes a first chamber with a first chamber inlet and a first chamber outlet and a second chamber with a second chamber inlet and a second chamber outlet. In some embodiments, the second chamber inlet is in fluid communication with the first chamber outlet. The first regulator is within the first chamber and separates the first chamber into an inlet pressure region at an inlet pressure and an intermediate pressure region at an intermediate pressure less than the inlet pressure. In various embodiments, the first regulator regulates the fluid from the inlet pressure to the intermediate pressure and controls a fluid flow from the inlet pressure region of the first chamber to the second chamber inlet based on the intermediate pressure. The second regulator is within the second chamber and separates the second chamber into an intermediate pressure region at the intermediate pressure and an outlet pressure region at an outlet pressure less than the intermediate pressure. The second regulator regulates the fluid from the intermediate pressure to the outlet pressure and controls a fluid flow from the second chamber through the second chamber outlet based on the outlet pressure. In some embodiments, the second regulator selectively defines a flow path from the intermediate pressure region of the second chamber to the outlet pressure region within the second chamber responsive to the intermediate pressure exceeding a predetermined threshold pressure.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

4

Figure 1:
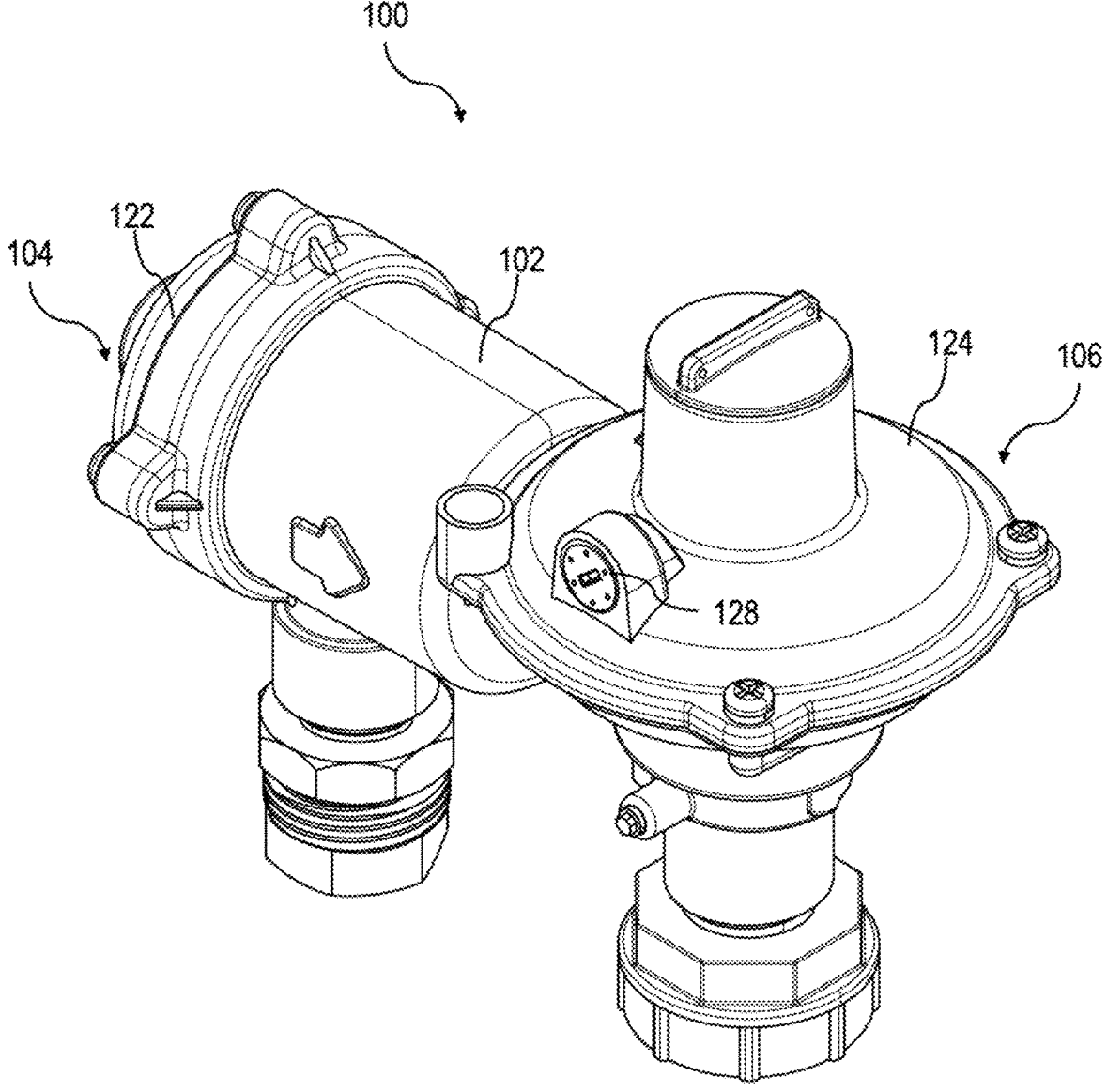
FIG. 1 is a perspective view of a fluid regulator assembly according to embodiments.
Figure 3:
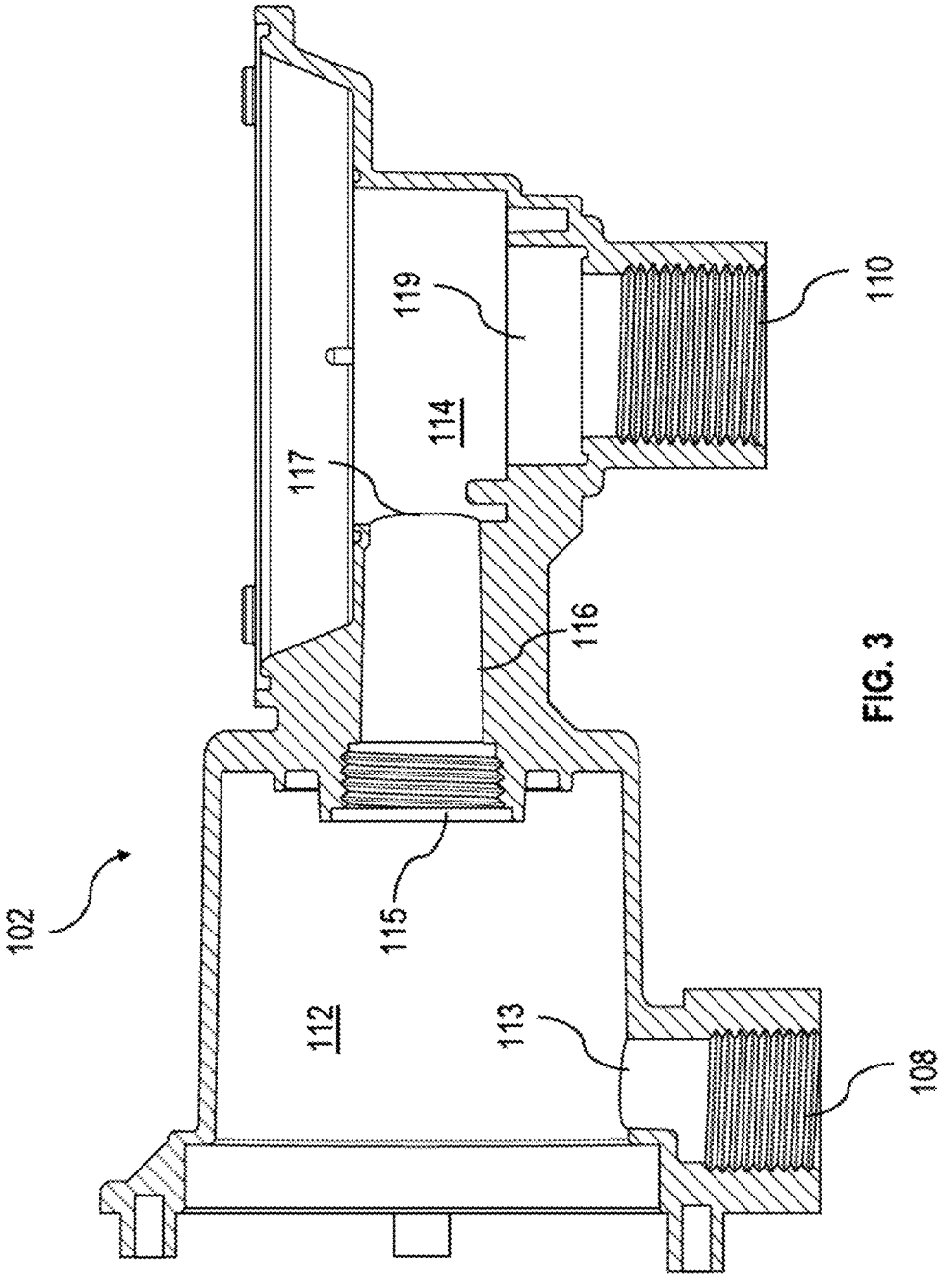

FIG. 3 is a sectional view of a housing of the fluid regulator assembly of FIG. 1.

Figure 4:
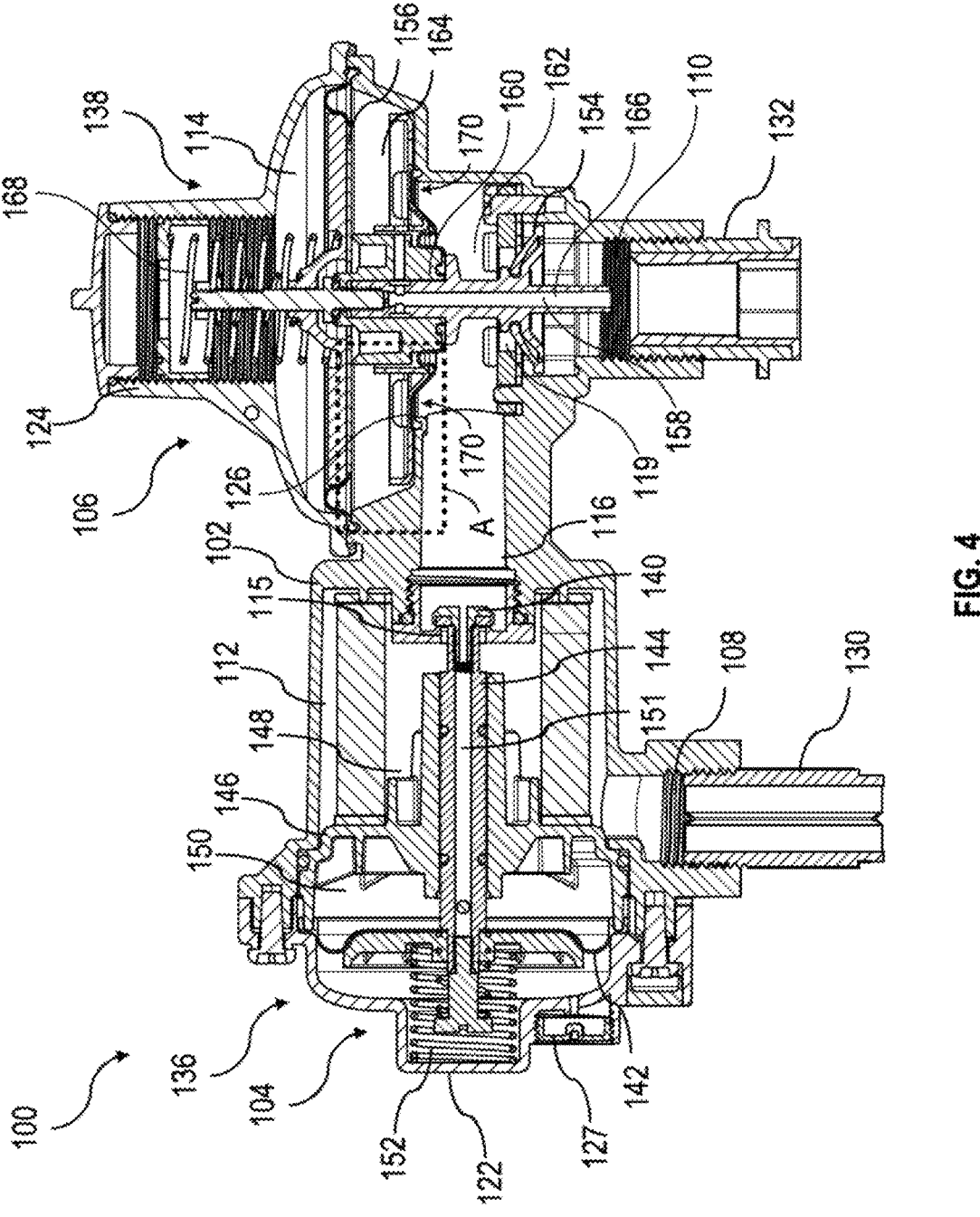

FIG. 4 is a sectional view of the fluid regulator assembly of FIG. 1.

Figure 5:
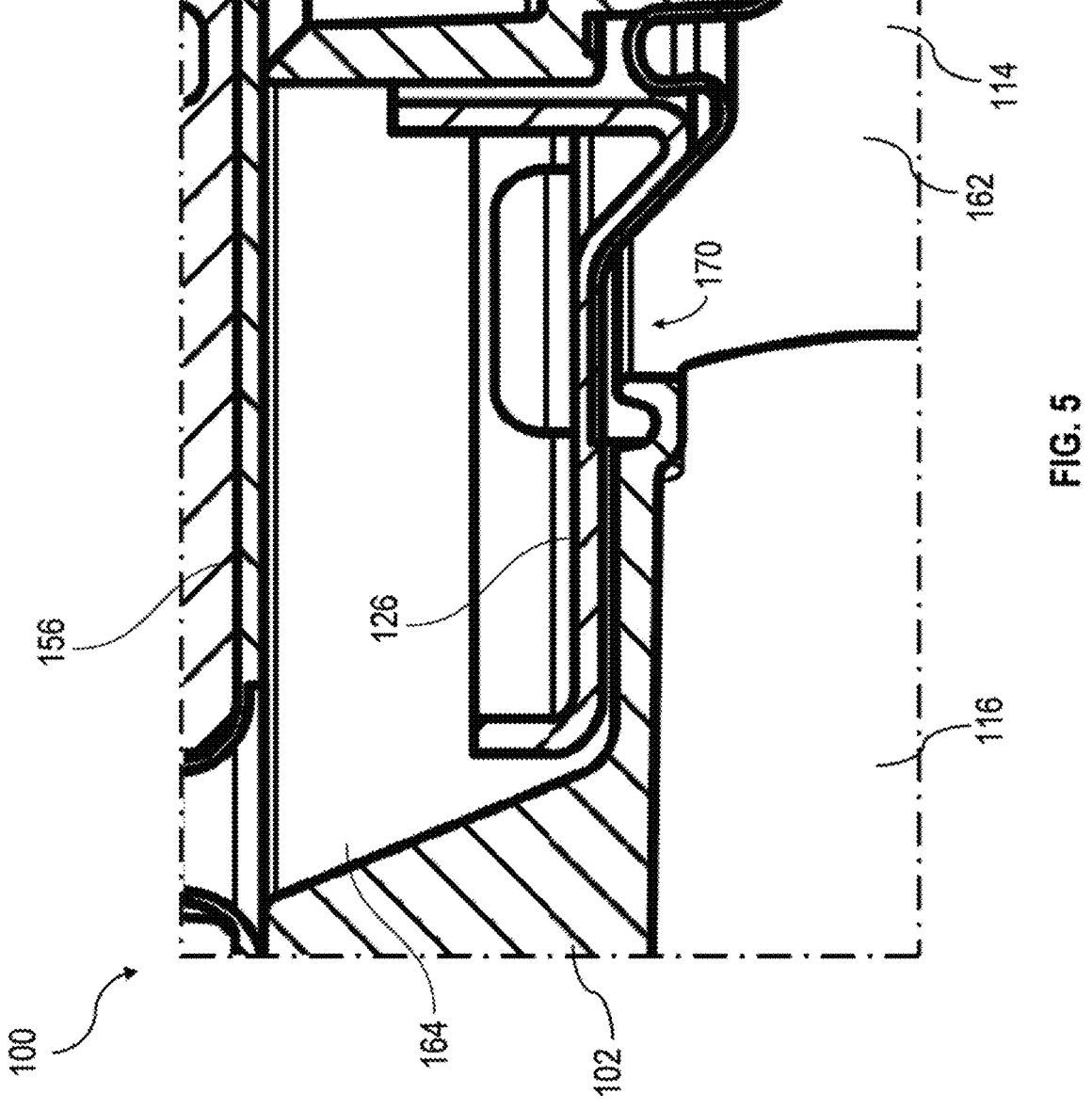

FIG. 5 is a sectional view of a portion of the fluid regulator assembly of FIG. 1 taken from circle A in FIG. 4 with a control device in a closed position.

Figure 6:
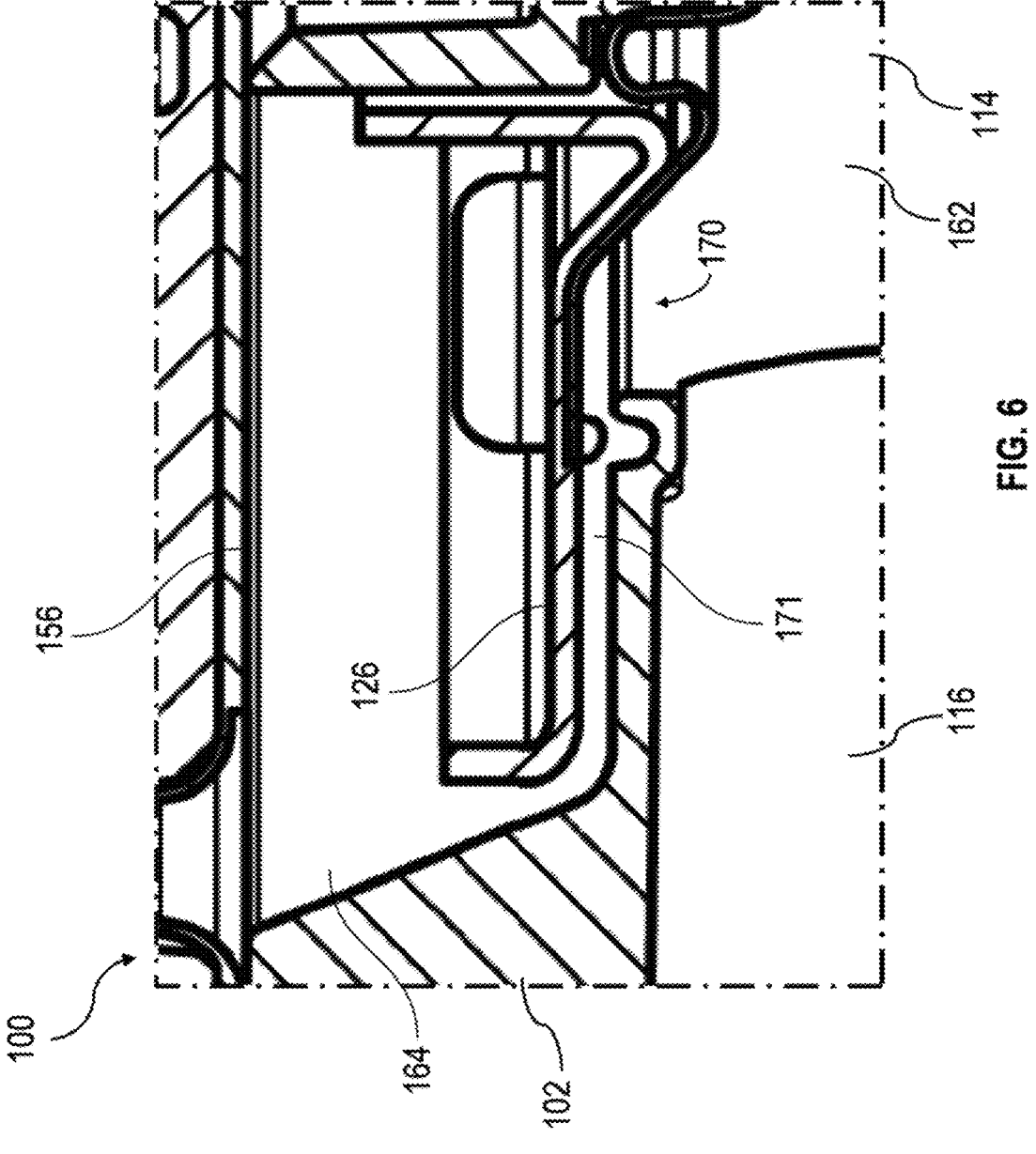

FIG. 6 is a sectional view of a portion of the fluid regulator assembly of FIG. 1 taken from circle A in FIG. 4 with the control device in an open position.

Figure 7:
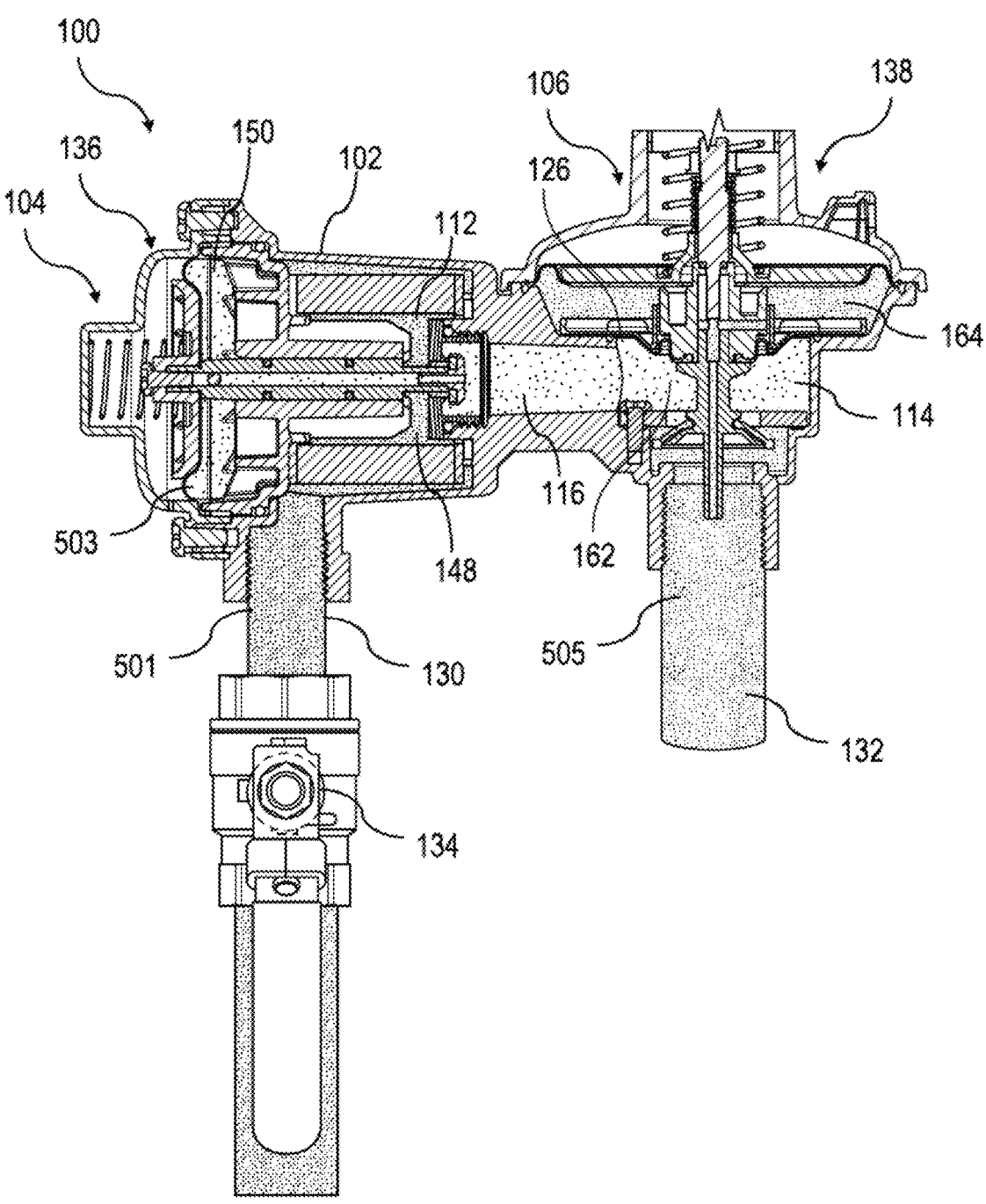

FIG. 7 is a sectional view of the fluid regulator assembly of FIG. 1 illustrating various pressure regions of the fluid regulator assembly.

DETAILED DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. In the figures and the description, like numerals are intended to represent like elements. While the systems and methods provided herein are discussed in the context of regulating a gas, in other embodiments, they may be used to regulate other types of fluids as desired, and reference to "gas" should not be considered limiting.

Described herein are fluid regulator assemblies for a fluid including but not limited to a gas. In certain embodiments, a fluid regulator assembly includes a housing with two control mechanisms within the housing. Under normal operating conditions, a first control mechanism within the housing may reduce a fluid pressure from an inlet fluid pressure to an intermediate fluid pressure, and a second control mechanism within the housing may reduce the fluid pressure from the intermediate fluid pressure to an outlet fluid pressure. As a non-limiting example, the first control mechanism may reduce the fluid pressure from the inlet fluid pressure to an intermediate fluid pressure of less than or equal to 7 kPa, and the second control mechanism may reduce the fluid pressure down to a normal operating pressure for a domestic household, such as less than 4 kPa, such as less than 3 kPa, such as about 2.75 kPa. In various embodiments, should the second control mechanism fail, the first control mechanism may ensure that downstream pipework receives the fluid at a maximum fluid pressure that is the intermediate fluid pressure (e.g., about 7 kPa in the non-limiting example). In certain embodiments, should the first control mechanism fail, the second control mechanism may close an outlet of the housing, which may protect the downstream customers from an otherwise spike in fluid pressure. In various embodiments, the second control mechanism closes the outlet because a control element of the second control mechanism deforms, thereby subjecting a balancing diaphragm of the second control mechanism to the full inlet pressure of the regulator.

In certain embodiments, the fluid regulator assemblies provided herein may allow for relief valves to be set to a higher point compared to traditional regulator assemblies. As a non-limiting example, the fluid regulator assemblies provided herein may allow for the relief valve to be set at a fluid pressure of 7 kPa. The ability to set the relief valve to higher set points may ensure that the fluid regulator assembly minimizes the amount of greenhouse gas emissions coming from the regulator assembly while ensuring a certain level of safety as required.

In certain embodiments, the fluid regulator assemblies described herein include at least one regulator with a plug, a diaphragm operably connected to the plug, and a control element within the fluid regulator that controls the pressure acting on the diaphragm. In certain embodiments, the control element may control the pressure acting on the diaphragm to be either an inlet pressure or an outlet pressure based on the inlet pressure at an inlet of the regulator. In some embodiments, the control element is selectively deformable such that the inlet pressure or the outlet pressure acts on the diaphragm based on the inlet pressure. In certain embodiments, the control element may cause the inlet pressure to be the pressure acting on the diaphragm responsive to the inlet pressure exceeding a predetermined threshold pressure and may cause the outlet pressure to be the pressure acting on the diaphragm responsive to the inlet pressure being at or less than the predetermined threshold pressure. In some embodiments, the control element is a switching diaphragm within the fluid regulator that is selectively deformable based on the inlet pressure such that the inlet pressure or the outlet pressure acts on the diaphragm. In various aspects, the control element may selectively define an internal flow path between two pressure regions within the fluid regulator responsive to the inlet pressure exceeding the predetermined threshold pressure.

In various embodiments, the control element controlling the pressure acting on the diaphragm may protect the diaphragm from bursting and may force the regulator to shut, thereby protecting the consumer. The control element optionally eliminates the need for an OPSO device, which in turn allows for a relief setting of the fluid regulator (i.e., the point at which the regulator vents to the environment) to be higher compared to traditional regulators. The higher relief setting may minimize false tripping, such as false tripping due to the sun's radiation or other environmental heating on a conduit for the fluid, and may reduce greenhouse gas emissions. In addition, while OPSO devices close off gas supply if the outlet pressure is exceeded, the regulator with the control element may provide protection based on upstream events and independent from what is happening downstream, which may further reduce the risk of false tripping. Certain other aspects of the regulator may further provide improved safety. As a non-limiting example, a piston of the regulator may be configured to obstruct an orifice of the regulator should the regulator fail. Various other benefits and advantages may be realized with the cooling systems described herein, and the aforementioned description should not be considered limiting.

FIGS. 1-7 illustrate an example of a fluid regulator assembly 100 according to various embodiments for regulating a fluid, such as a gas. The fluid regulator assembly 100 may regulate the fluid such that a pressure of the fluid is reduced from an inlet pressure to an outlet pressure less than the inlet pressure. The fluid regulator assembly 100 generally includes a housing 102 and at least one regulator with a control element 126 for improved pressure control. In the embodiment illustrated, and as discussed in detail below, the fluid regulator assembly 100 includes two regulators, a first regulator 104 and a second regulator 106, of which the second regulator 106 includes the control element 126.

Referring to FIGS. 3-7, in various embodiments, the housing 102 includes a housing inlet 108 for receiving a supply of fluid, such as from a supply conduit 130 connected to a gas supply system, and a housing outlet 110 for delivering the fluid to a downstream user via a delivery conduit 132, such as to a factory, restaurant, apartment building, etc. having one or more systems that use the fluid. As illustrated in FIG. 7, the supply conduit 130 and/or the delivery conduit 132 may optionally include a control valve 134 and/or other devices or mechanisms for controlling the flow of fluid upstream or downstream from the fluid regulator assembly 100.

In certain embodiments, the housing 102 includes at least one chamber between the housing inlet 108 and the housing outlet 110 such that the fluid must pass through the chamber to travel between the housing inlet 108 and the housing outlet 110. In the embodiment illustrated, the housing 102 includes two chambers—a first chamber 112 and a second chamber 114—between the housing inlet 108 and the housing outlet 110. In this embodiment, the first chamber 112 includes a first chamber inlet 113 and a first chamber outlet 115, and the second chamber 114 includes a second chamber inlet 117 and a second chamber outlet 119. Optionally, an intermediate passage 116 fluidly connects the first chamber 112 and the second chamber 114. In this embodiment, the fluid flowing through the fluid regulator assembly 100 must pass through the first chamber inlet 113, the first chamber 112, the first chamber outlet 115, the intermediate passage 116, the second chamber inlet 117, the second chamber 114, and the second chamber outlet 119 to travel between the housing inlet 108 and the housing outlet 110.

Figure 2:
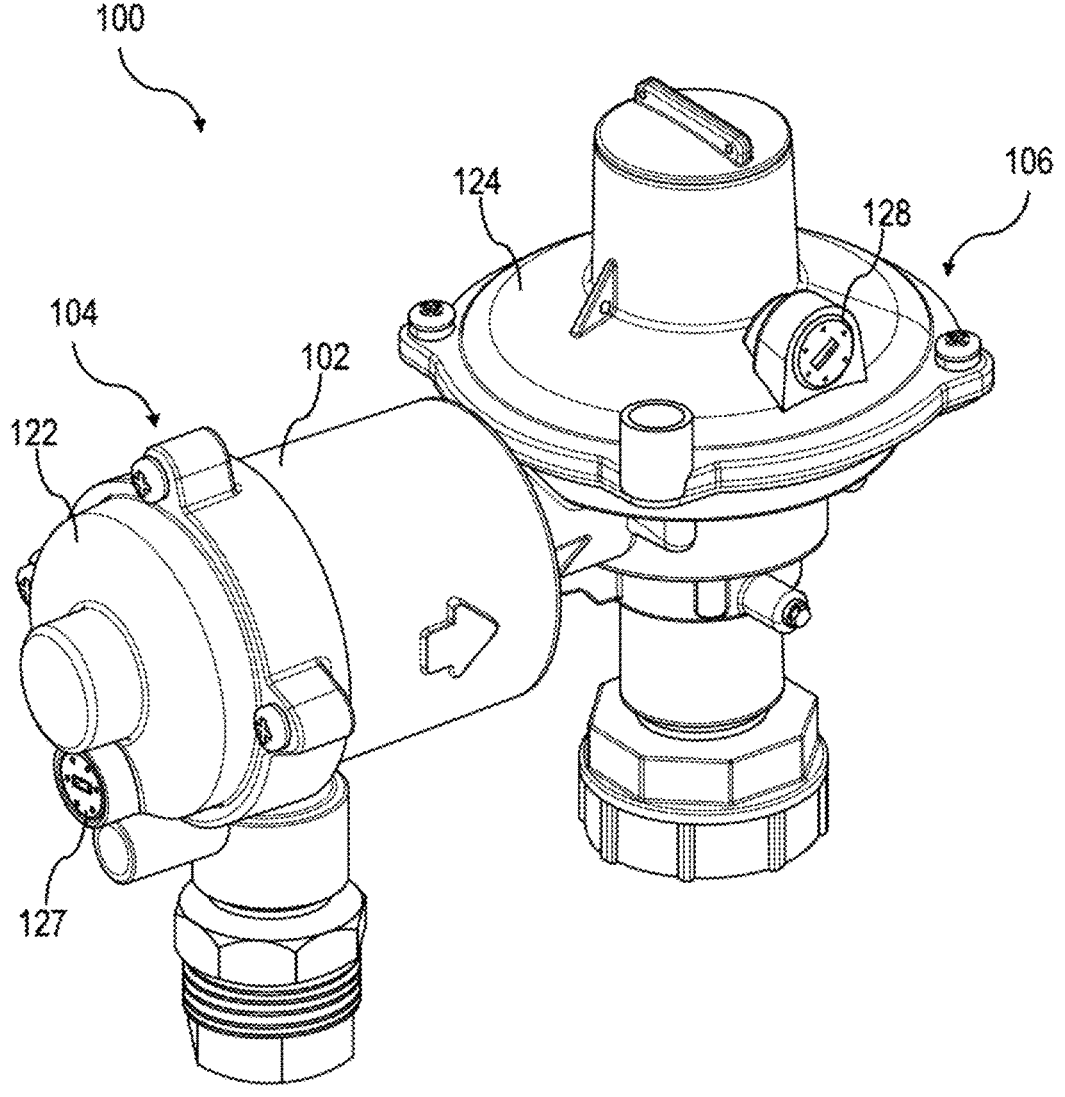
FIG. 2 is another perspective view of the fluid regulator assembly of FIG. 1.

In certain embodiments, and as illustrated in FIG. 4, for example, a first cover 122 may be coupled to the housing 102 for enclosing the first chamber 112, and a second cover 124 may be coupled to the housing 102 for enclosing the second chamber 114. In various embodiments, the first cover 122 and/or the second cover 124 are removably attached to the housing 102 such that the chambers 112, 114 and/or components of the regulators 104, 106 within the chambers 112, 114 can be selectively accessed as desired. Optionally, and as illustrated in FIGS. 1, 2, and 4, the first cover 122 may include a first relief feature 127 for selectively venting the first chamber 112. Similarly, the second cover 124 optionally may include a second relief feature 128 for selectively venting the second chamber 114.

Referring to FIG. 4, the regulators 104, 106 will be discussed in detail. As mentioned, in certain embodiments, a fluid regulator assembly need not include two regulators, and it may instead include one regulator with the control element 126 and/or a plurality of regulators of which at least one includes the control element 126. In the embodiment illustrated, the first regulator 104 includes a first control assembly 136 for regulating the flow of fluid through from the first chamber 112, through the first chamber outlet 115, and into the intermediate passage 116. In certain embodiments, the first control assembly 136 regulates the fluid from an inlet pressure to an intermediate pressure less than the inlet pressure based on a sensed intermediate pressure. The second regulator 106 similarly includes a second control assembly 138 for regulating the flow of fluid from the second chamber 114, through the second chamber outlet 119, and to the housing outlet 110. Compared to the first control assembly 136, the second control assembly 138 includes the control element 126 that selectively controls whether the second control assembly 138 controls the flow based on the intermediate pressure upstream from the second chamber outlet 119 (e.g., within the second chamber 114 and/or the intermediate passage 116) or based on an outlet pressure downstream from the second chamber outlet 119. In some embodiments, and as discussed in detail below, the control element 126 controls the second control assembly 138 responsive to the intermediate pressure (or the pressure of the fluid supplied to the second regulator 106) exceeding or being less than or equal to a predefined threshold pressure. As one non-limiting example, the control element 126 controls the second control assembly 138 to be responsive to the outlet pressure based on the intermediate pressure being less than or equal to the predefined threshold pressure, and the control element 126 controls the second control assembly 138 to be responsive to the intermediate pressure based on the intermediate pressure exceeding the predefined threshold pressure.

In the embodiment illustrated in FIG. 4, the first control assembly 136 includes a plug 140, a diaphragm 142, and a piston (or stem) 144. The plug 140 may be various suitable devices or features for selectively obstructing or enabling fluid flow from the first chamber 112 and through the first chamber outlet 115. The particular plug 140 illustrated in FIG. 4 should not be considered limiting. In various embodiments, and as discussed in detail below, the plug 140 is positionable by the diaphragm 142 such that the plug 140 is movable relative to the first chamber outlet 115 between an open position and a closed position. Optionally, the plug 140 includes one or more sealing elements that selectively form a seal with the first chamber outlet 115 when the plug 140 is in the closed position in some embodiments, and as illustrated in FIG. 4, the plug 140 is positioned at least partially within the first chamber outlet 115 and/or is at least partially downstream from the first chamber outlet 115, however, in other embodiments, the plug 140 may be positioned as desired relative to the first chamber outlet 115 for selectively obstructing or enabling flow through the first chamber outlet 115.

The piston 144 operably connects the plug 140 with the diaphragm 142 such that the diaphragm 142 selectively positions the plug 140 relative to the first chamber outlet 115. In various embodiments, and as illustrated in FIG. 4, a support 146 may support the piston 144, and the piston 144 may be movable relative to the support 146. In some embodiments, the support 146 may separate the first chamber 112 into a first pressure region 148 and a second pressure region 150. The first pressure region 148 may include the fluid at the inlet pressure and the second pressure region 150 may include the fluid at the intermediate pressure. In these embodiments, and as illustrated in FIG. 4, the piston 144 may define a passage 151, optionally with the plug 140, extending from the intermediate passage 116 to the second pressure region 150 such that the second pressure region 150 is in fluid communication with the intermediate passage 116. In certain embodiments, the piston 144 comprises a blocking shape or profile such that the piston 144 may block the first chamber outlet 115 should the piston 144 fail.

The diaphragm 142 may be supported within the second pressure region 150 of the first chamber 112 such that the diaphragm 142 senses and is responsive to the fluid at the intermediate pressure. The diaphragm 142 may be various suitable flexible devices or members as desired. Optionally, a biasing member 152, including but not limited to a spring, applies a biasing force to the diaphragm 142 that offsets the intermediate pressure acting on the diaphragm 142. In certain embodiments, the biasing member 152 is adjustable such that a desired balancing pressure may be set by adjusting the biasing member 152.

An example of control of the fluid using the first regulator 104 and regulating from the inlet pressure to the intermediate pressure is described below. In one example, a decreased or decreasing intermediate pressure may be sensed by the diaphragm 142 (i.e., the intermediate pressure acting against the diaphragm 142 is reduced), and the detected decreased intermediate pressure allows for the diaphragm 142 to move to the right in FIG. 4. In particular, the diaphragm 142 moves to the right to maintain a balance between the biasing force applied by the biasing member 152 and the intermediate pressure. Movement of the diaphragm 142 in turn causes the plug 140 to move away from the first chamber outlet 115 (e.g., further into the intermediate passage 116) and open the first chamber outlet 115 to increase the fluid flow through the first chamber outlet 115 and increase the intermediate pressure. Conversely, an increased or increasing intermediate pressure may be sensed by the diaphragm 142, and the detected increased intermediate pressure moves the diaphragm 142 to the left in FIG. 4. Such movement maintains the balance between the biasing force applied by the biasing member 152 and the increased intermediate pressure. In this example, the movement by the diaphragm 142 in turn causes the plug 140 to move towards the first chamber outlet 115 to close and/or limit the fluid flow through the first chamber outlet 115 and decrease the intermediate pressure.

Similar to the first control assembly 136, the second control assembly 138 of the second regulator 106 includes a plug 154, a diaphragm 156, and a piston 158. The plug 154 may be various suitable devices or features for selectively obstructing or enabling fluid flow from the second chamber 114 and through the second chamber outlet 119. In some embodiments, and as illustrated in FIG. 4, at least one characteristic of the plug 154 may be different from the plug 140; however, in other embodiments, the plug 154 may be substantially similar to the plug 140. The plug 154 is positionable by the diaphragm 156 such that the plug 154 is movable relative to the second chamber outlet 119 between an open position and a closed position. In certain cases, the plug 154 optionally includes one or more sealing elements that selectively form a seal with the second chamber outlet 119 when the plug 154 is in the closed position.

The piston 158 operably connects the plug 154 with the diaphragm 156 such that the diaphragm 156 selectively positions the plug 154 relative to the second chamber outlet 119. In various embodiments, and as illustrated in FIG. 4, a support 160 may support the piston 158, and the piston 158 may be movable relative to the support 160. Compared to the support 146, the support 160 defines a passage 170 (see FIG. 4) that is selectively opened or closed by the control element 126. In some embodiments, the support 160 in conjunction with the control element 126 may separate the second chamber 114 into a first pressure region 162 and a second pressure region 164. The first pressure region 162 may include the fluid at the intermediate pressure and the second pressure region 164 may include the fluid at the outlet pressure. In this manner, the first pressure region 162 may be an intermediate pressure region and the second pressure region 164 may be an outlet pressure region.

In certain embodiments, and as illustrated in FIG. 4, the piston 158 may define a passage 166, optionally with the plug 154, which extends from downstream from the second chamber outlet 119 to the second pressure region 164. In such examples, the second pressure region 164 is in fluid communication with the housing 102 downstream from the second chamber outlet 119 via the piston 158, and the fluid at the outlet pressure can be provided to the second pressure region 164 via the piston 158. Similar to the piston 144, the piston 158 optionally includes a blocking shape or profile such that the piston 158 may selectively block the second chamber outlet 119 if the piston 158 fails.

The diaphragm 156 may be supported within the second pressure region 164 of the second chamber 114 and may be various suitable flexible devices or members as desired. Optionally, a biasing member 168, including but not limited to a spring, applies a biasing force to the diaphragm 156 that offsets the pressure acting on the diaphragm 156. In certain embodiments, the biasing member 168 is adjustable such that a desired balancing pressure may be set by adjusting the biasing member 168. As discussed in detail below, the diaphragm 156 may selectively position the plug 154 based on the intermediate pressure or the outlet pressure depending on the control element 126.

The control element 126 of the second regulator 106 is supported on the support 160 such that the control element 126 and the support 160 at least partially separate the second chamber 114 into the first pressure region 162 and the second pressure region 164. As mentioned, in certain embodiments, the control element 126 is movable between a first (or closed) position (see, e.g., FIG. 5) and a second (or open) position (see, e.g., FIG. 6) relative to the support 160 such that the control element 126 selectively opens or closes the passage 170 to selectively defines a flow path region 171 from the first pressure region 162 to the second pressure region 164. In some cases, in the first position, the first pressure region 162 is not fluidly connected to the second pressure region 164 within the second chamber 114 (e.g., the pressure regions 162, 164 are fully separated), and in the second position, the first pressure region 162 is fluidly connected to the second pressure region 164 within the second chamber 114 (e.g., the pressure regions 162, 164 are partially separated).

In some embodiments, the control element 126 is movable between the first position and the second position based on the intermediate pressure within the first pressure region 162, and the control element 126 may be various suitable devices or mechanisms for sensing and responding to the sensed intermediate pressure. In the embodiment illustrated, the control element 126 is a switching diaphragm that includes a flexible material, and the switching diaphragm may be selectively deformable to move the control element 126 from the first position to the second position. In other embodiments, other suitable mechanisms or devices may be used as the control element 126 as desired.

As best illustrated in FIG. 5, in certain embodiments, in the first position, the control element 126 obstructs the passage 170, and a flow path is not defined between the pressure regions 162, 164. In these embodiments, the diaphragm 156 controls the position of the plug 154 based on the outlet pressure. As an example, the fluid at the outlet pressure may flow from a region downstream from the second chamber outlet 119, through the piston 158, and into the second pressure region 164 such that the fluid at the outlet pressure acts on the diaphragm 156 to position the plug 154. FIG. 4 also illustrates the control element 126 in the first position.

As best illustrated in FIG. 6, in the second position, the control element 126 opens the passage 170 such that the flow path region 171 is defined between the pressure regions 162, 164, and a fluid may flow from the second pressure region 164, through the flow path region 171, and into the first pressure region 162. In the second position of the control element 126, the diaphragm 156 controls the position of the plug 154 based on the intermediate pressure, or the pressure of the fluid upstream from the second chamber outlet 119.

In various embodiments, the control element 126 is movable from the first position to the second position based on the sensed intermediate pressure exceeding a predetermined threshold pressure. The predetermined threshold pressure may be various pressures as desired. In some embodiments, the predetermined threshold pressure may be a safety or other pressure above which the consumer is to be protected. As one non-limiting example, the predetermined threshold pressure may be from about 6.5 kPa to about 15 kPa, such as from about 6.5 kPa to about 10 kPa, such as from about 6.5 kPa to about 7.0 kPa. However, in other embodiments, the predetermined threshold pressure may be set to be various other pressures as desired.

Non-limiting examples of flow control using the second regulator 106 are described in detail below. In a first example, the control element 126 may sense that the intermediate pressure is at or below the predetermined threshold pressure and may remain in the first position. In this example and while the intermediate pressure is at or below the predetermined threshold pressure, the second regulator 106 may function similar to the first regulator 104. For example, a decreased or decreasing outlet pressure (downstream from the second chamber outlet 119) may be sensed by the diaphragm 156, and the detected decreased intermediate pressure allows for the diaphragm 156 to move down in FIG. 4. In particular, the diaphragm 156 moves down to maintain a balance between the biasing force applied by the biasing member 168 and the outlet pressure. Movement of the diaphragm 156 in turn causes the plug 154 to move away from the second chamber outlet 119 and open the second chamber outlet 119 to increase the fluid flow through the second chamber outlet 119 and increase the outlet pressure. Conversely, while the intermediate pressure is at or below the predetermined threshold pressure, an increased or increasing outlet pressure may be sensed by the diaphragm 156, and the detected increased outlet pressure moves the diaphragm 156 up in FIG. 4. Such movement maintains the balance between the biasing force applied by the biasing member 168 and the increased outlet pressure. Such movement by the diaphragm 156 in turn causes the plug 154 to move towards the second chamber outlet 119 to close and/or limit the fluid flow through the second chamber outlet 119 and decrease the outlet pressure.

In a second example, the control element 126 may sense that the intermediate pressure exceeds the predetermined threshold pressure and moves to the second position such that the flow path region 171 is defined between the pressure regions 162, 164 as illustrated, for example, in FIG. 6. In this example and while the intermediate pressure exceeds the predetermined threshold pressure, the intermediate pressure acts on the diaphragm 156 rather than the outlet pressure, and the diaphragm 156 balances the biasing force applied by the biasing member 168 and the intermediate pressure.

FIG. 7 illustrates the various pressure regions within the fluid regulator assembly 100 during normal operation of the fluid regulator assembly 100. In this embodiment, the pattern 501 of densely arranged larger dots represents regions where the fluid is at an inlet pressure, the pattern 503 of less densely arranged thicker dots represents regions where the fluid is at an intermediate pressure, and the pattern 505 of densely arranged smaller dots represents regions where the fluid is at an outlet pressure. During normal operation, the first regulator 104 reduces the pressure of the fluid from the inlet pressure to an intermediate pressure less than the inlet pressure, and the second regulator 106 reduces the pressure of the fluid from the intermediate pressure to the outlet pressure that is less than the intermediate pressure. In one non-limiting example, the inlet pressure may be greater than 20 kPa, such as from 20 kPa to about 800 kPa, although in other embodiments the inlet pressure may be various other inlet pressures as desired. In a non-limiting example, the intermediate pressure may be from 4.0-7.0 kPa, such as from 4.0-6.5 kPa, although in other embodiments the intermediate pressure may be various other intermediate pressures less than the inlet pressure as desired. In a non-limiting example, the outlet pressure may be from 1.0-3.0 kPa, such as from 2.0-3.0 kPa, such as from 1.1-1.5 kPa, although in other embodiments the outlet pressure may be various other outlet pressures less than the inlet pressure as desired.

As previously mentioned, the control device 126 of the second regulator 106 may control the second regulator 106 such that the diaphragm 156 moves the plug 154 based on the outlet pressure when the intermediate pressure is at or below the predetermined threshold value. Should the intermediate pressure exceed the predetermined threshold value, the control element 126 deforms and/or otherwise opens the passage 170 such that the intermediate pressure acts on the diaphragm 156 and the diaphragm 156 moves the plug 154 based on the intermediate pressure.

Control of the fluid using the fluid regulator assembly 100 is discussed in an example below. The values of the particular pressures discussed in this example should not be considered limiting. In this example, during normal operation, the fluid regulating assembly receives fluid at the housing inlet 108 and at an inlet pressure of 20-500 kPa. The first regulator 104 is controlled by the intermediate pressure acting on the diaphragm 142 to control the flow of the fluid through the first chamber outlet 115 (e.g., the diaphragm 142 moves the plug 140 based on the intermediate pressure, which in turn controls the flow of the fluid through the first chamber outlet 115). Such control by the first regulator 106 reduces the pressure from the inlet pressure to the intermediate pressure of 4.0-6.5 kPa. The fluid at the intermediate pressure is supplied to the second regulator 106. The control element 126 of the second regulator 106 may be set such that the predetermined threshold pressure is 6.5 kPa. In this initial stage where the intermediate pressure is from 4.0-6.5 kPa (or at or below the predetermined threshold pressure), the control element 126 remains in its first position, and the second regulator 106 is controlled by the outlet pressure acting on the diaphragm 156 to control the flow of the fluid through the second chamber outlet 119 (e.g., the diaphragm 156 moves the plug 154 based on the outlet pressure, which in turn controls the flow of the fluid through the second chamber outlet 119). Such control reduces the pressure from the intermediate pressure to an outlet pressure of 1.1-3.0 kPa, such as 1.1-1.5 kPa. During operation, the fluid regulating assembly 100 may suffer an event causing the first regulator 104 to fail and be unable to regulate the inlet pressure from 20-500 kPa down to 4.0-6.5 kPa. For example, the failed first regulator 104 may regulate the inlet pressure down to an increased intermediate pressure of 12-17 kPa. In this example, the control element 126 senses that the increased intermediate pressure (12-17 kPa) is greater than the predetermined threshold pressure (6.5 kPa), thereby causing the control element 126 to deform and/or otherwise open the passage 170 such that fluid at the increased intermediate pressure acts on the diaphragm 156. In this example, the sudden change in pressure acting on the diaphragm 156 (i.e., 1.1-3.0 kPa in regular conditions vs.

12-17 kPa of the increased intermediate pressure) causes the diaphragm 156 to move the plug 154 to close the second chamber outlet 119.

The aforementioned control by the control element 126 may protect the diaphragm 156 from bursting and protect the user from a sudden increase in fluid pressure. This control by the control element 126 may also eliminate the need for an OPSO device. In certain embodiments, the control element 126 may also allow for venting via the relief features 127, 128 to be set to higher pressures compared to traditional regulators, which may reduce greenhouse gases that are vented into the environment compared to traditional regulators.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A fluid regulator assembly for a fluid, the fluid regulator assembly comprising: a housing comprising an inlet, an outlet, and a chamber between the inlet and the outlet and in fluid communication with the inlet and the outlet; and a regulator coupled to the housing and comprising a control assembly, wherein the control assembly comprises a plug, a diaphragm operably coupled to the plug, and a control element, wherein the plug is movable relative to the outlet for controlling a flow of fluid through the housing, wherein the diaphragm is configured to control the plug responsive to a control pressure acting on the diaphragm, wherein the control element is positionable between a first position and a second position for controlling the control pressure acting on the diaphragm, wherein, in the first position, the control pressure is an outlet pressure downstream from the outlet, and wherein, in the second position, the control pressure is at least an inlet pressure upstream from the outlet.

Illustration 2. The fluid regulator assembly of any preceding or subsequent illustrations or combination of illustrations, wherein the control element is movable from the first position to the second position responsive to the inlet pressure exceeding a predetermined threshold pressure.

Illustration 3. The fluid regulator assembly of any preceding or subsequent illustrations or combination of illustrations, wherein the predetermined threshold pressure is greater than 7.0 kPa.

Illustration 4. The fluid regulator assembly of any preceding or subsequent illustrations or combination of illustrations, wherein the control element is a switching diaphragm within the chamber, and wherein the diaphragm is deformable within the chamber such that the switching diaphragm is positionable between the first position and the second position.

Illustration 5. The fluid regulator assembly of any preceding or subsequent illustrations or combination of illustrations, wherein the regulator further comprises: a piston connecting the diaphragm and the plug, a support within the chamber, wherein the support supports the piston within the chamber such that the piston is movable relative to the support, and wherein the support supports the control element within the chamber; and a biasing member biasing the diaphragm.

Illustration 6. The fluid regulator assembly of any preceding or subsequent illustrations or combination of illustrations, wherein, in the first position, the control element separates the chamber into an inlet pressure region at the inlet pressure and an outlet pressure region at the outlet pressure, wherein the outlet pressure is less than the inlet pressure, and wherein a flow path is defined through the outlet and to the outlet pressure region.

Illustration 7. The fluid regulator assembly of any preceding or subsequent illustrations or combination of illustrations, wherein the regulator further comprises a piston connecting the diaphragm and the plug, wherein the piston extends at least partially into the outlet, and wherein the piston comprises a passage such that the flow path is defined through the outlet, through the piston, and into the outlet pressure region of the chamber.

Illustration 8. The fluid regulator assembly of any preceding or subsequent illustrations or combination of illustrations, wherein, in the second position, the control element is deformed such that a flow path is defined within the chamber from the inlet pressure region to the outlet pressure region.

Illustration 9. A fluid regulator assembly for a fluid, the fluid regulator assembly comprising: a housing comprising an inlet, an outlet, and a chamber between the inlet and the outlet and in fluid communication with the inlet and the outlet, and a regulator coupled to the housing and comprising a control assembly, wherein the control assembly comprises a plug, a diaphragm operably coupled to the plug, and a control element, wherein the plug is movable relative to the outlet for controlling a flow of fluid through the housing, wherein the control element is adjustable based on an inlet pressure upstream from the outlet such that: when the inlet pressure is at or below a predetermined threshold pressure, the diaphragm controls the plug responsive to an outlet pressure downstream from the outlet; and when the inlet pressure exceeds the predetermined threshold pressure, the diaphragm controls the plug responsive to the inlet pressure.

Illustration 10. The fluid regulator assembly of any preceding or subsequent illustrations or combination of illustrations, wherein the regulator further comprises: a piston connecting the diaphragm and the plug, wherein the piston is configured to obstruct the outlet responsive to a failure of the piston; and a support within the chamber, wherein the support supports the piston within the chamber such that the piston is movable relative to the support, and wherein the support supports the control element within the chamber.

Illustration 11. The fluid regulator assembly of any preceding or subsequent illustrations or combination of illustrations, wherein the control element separates the chamber into an inlet pressure region at the inlet pressure and an outlet pressure region at the outlet pressure responsive to the inlet pressure being at or below the predetermined threshold pressure, wherein the diaphragm is within the outlet pressure region, wherein the outlet pressure is less than the inlet pressure, and wherein a flow path is defined through the outlet and to the outlet pressure region.

Illustration 12. The fluid regulator assembly of any preceding or subsequent illustrations or combination of illustrations, wherein the regulator further comprises a piston connecting the diaphragm and the plug, wherein the piston extends at least partially into the outlet, and wherein the piston comprises a passage such that the flow path is defined from the outlet, through the piston, and into the outlet pressure region of the chamber.

Illustration 13. The fluid regulator assembly of any preceding or subsequent illustrations or combination of illustrations, wherein the control element is a switching diaphragm within the chamber, and wherein the diaphragm is deformable within the chamber such that the plug is controlled responsive to the outlet pressure or the inlet pressure.

Illustration 14. A fluid regulator assembly for a fluid, the fluid regulator assembly comprising: a housing comprising: a first chamber comprising a first chamber inlet and a first chamber outlet, wherein the first chamber inlet is configured to receive the fluid at an inlet pressure; a second chamber comprising a second chamber inlet and a second chamber outlet; and an intermediate passage connecting the first chamber outlet with the second chamber inlet; a first regulator comprising a first control assembly, wherein the first control assembly comprises a first plug and a first diaphragm operably coupled to the first plug, wherein the first plug is movable relative to the first chamber outlet for controlling a flow of fluid through the first chamber outlet, and wherein the first diaphragm is within the first chamber and is configured to position the first plug responsive to an intermediate pressure; and a second regulator comprising a second control assembly, wherein the second control assembly comprises a second plug, a second diaphragm operably connected to the second plug, and a control element, wherein the second plug is movable relative to the second chamber outlet for controlling a flow of fluid through the second chamber outlet, wherein the second diaphragm is within the second chamber and is configured to position the second plug responsive to a control pressure, and wherein the control element is configured to control the control pressure responsive to the intermediate pressure and such that the control pressure is the intermediate pressure or an outlet pressure downstream from the second chamber outlet.

Illustration 15. The fluid regulator assembly of any preceding or subsequent illustrations or combination of illustrations, wherein the control element is configured to control the control pressure as the intermediate pressure or the outlet pressure responsive to the intermediate pressure exceeding a predetermined threshold pressure, wherein, at or below the predetermined threshold pressure, the control elements controls the second regulator such that the outlet pressure is the control pressure, and wherein, above the predetermined threshold pressure, the control element controls the second regulator such that the intermediate pressure is the control pressure.

Illustration 16. The fluid regulator assembly of any preceding or subsequent illustrations or combination of illustrations, wherein the control element is a switching diaphragm within the second chamber, and wherein the switching diaphragm is selectively deformable responsive to the intermediate pressure such that the second plug is positioned responsive to the intermediate pressure or the outlet pressure.

Illustration 17. The fluid regulator assembly of any preceding or subsequent illustrations or combination of illustrations, wherein the control element separates the second chamber into an intermediate pressure region and an outlet pressure region responsive to the intermediate pressure being at or below a predetermined threshold pressure, wherein the intermediate pressure region is at the intermediate pressure and the outlet pressure region is at the outlet pressure, wherein the second diaphragm is within the outlet pressure region, wherein the outlet pressure is less than the intermediate pressure, and wherein a flow path is defined from the second chamber outlet and to the intermediate pressure region.

Illustration 18. The fluid regulator assembly of any preceding or subsequent illustrations or combination of illustrations, wherein the second regulator further comprises a piston connecting the second diaphragm and the second plug, wherein the piston extends at least partially into the second chamber outlet, and wherein the piston comprises a passage such that the flow path is defined from the outlet, through the piston, and into the outlet pressure region of the chamber.

Illustration 19. The fluid regulator assembly of any preceding or subsequent illustrations or combination of illustrations, wherein the first regulator further comprises: a piston connecting the first diaphragm and the first plug; and a support within the first chamber, wherein the support supports the piston within the first chamber such that the piston is movable relative to the support, wherein the support separates the first chamber into an inlet pressure region at the inlet pressure and an intermediate pressure region at the intermediate pressure, and wherein the first diaphragm is within the intermediate pressure region.

Illustration 20. The fluid regulator assembly of any preceding or subsequent illustrations or combination of illustrations, wherein the piston extends at least partially into the intermediate passage, and wherein the piston defines a passage fluidly connecting the intermediate pressure region of the first chamber with the intermediate passage.

Illustration 21. A fluid regulator assembly for a fluid, the fluid regulator assembly comprising: a housing comprising an inlet, a chamber, and an outlet, wherein the chamber is in fluid communication with the inlet and the outlet; and a regulator at least partially within the chamber and configured to separate the chamber into an inlet pressure region at an inlet pressure and an outlet pressure region at an outlet pressure less than the inlet pressure, wherein the regulator is configured to regulate the fluid from the inlet pressure to the outlet pressure and control a fluid flow from the chamber through the outlet based on the outlet pressure, and wherein the regulator is configured to define a flow path from the inlet pressure region to the outlet pressure region within the chamber responsive to the inlet pressure exceeding a predetermined threshold pressure.

Illustration 22. The fluid regulator assembly of any preceding or subsequent illustrations or combination of illustrations, wherein the regulator comprises; a diaphragm within the outlet pressure region; a biasing member applying a biasing force against the diaphragm; and a plug operably connected to the diaphragm, wherein the diaphragm is configured to regulate the fluid from the inlet pressure to the outlet pressure and control a fluid flow from the chamber through the outlet by balancing the outlet pressure with the biasing force, and wherein balancing by the diaphragm positions the plug relative to the outlet.

Illustration 23. The fluid regulator assembly of any preceding or subsequent illustrations or combination of illustrations, wherein the regulator further comprises a switching diaphragm within the chamber and separating the inlet pressure region from the outlet pressure region, wherein the switching diaphragm is selectively deformable such that the flow path from the inlet pressure region to the outlet pressure region is selectively defined by the regulator.

Illustration 24. The fluid regulator assembly of any preceding or subsequent illustrations or combination of illustrations, wherein the regulator further comprises a support; and a piston supported by the support and movable relative to the support, wherein the plug is operable connected to the diaphragm via the piston, and wherein the piston is configured to obstruct the outlet responsive to a failure of the piston.

Illustration 25. The fluid regulator assembly of any preceding or subsequent illustrations or combination of illustrations, wherein the regulator further comprises: a support;

a piston supported by the support and movable relative to the support; a first diaphragm connected to the piston and configured to position the piston relative to the support; and a second diaphragm connected to the support and separating the inlet pressure region from the outlet pressure region, wherein the second diaphragm is selectively deformable responsive to the inlet pressure exceeding the predetermined threshold pressure, and wherein deformation of the second diaphragm defines the flow path from the inlet pressure region to the outlet pressure region within the chamber.

Illustration 26. The fluid regulator assembly of any preceding or subsequent illustrations or combination of illustrations, wherein the predetermined threshold pressure is 7.0 kPa.

Illustration 27. A fluid regulator assembly for a fluid, the fluid regulator assembly comprising: a housing comprising a first chamber comprising a first chamber inlet and a first chamber outlet; second chamber comprising a second chamber inlet and a second chamber outlet; and an intermediate passage fluidly connecting the first chamber outlet with the second chamber inlet; a first regulator at least partially within the first chamber and comprising a first diaphragm and a first plug, wherein the first diaphragm is configured to selectively position the first plug to control a fluid flow from the first chamber to the intermediate passage through the first chamber outlet and regulate the fluid from an inlet pressure to an intermediate pressure; and a second regulator at least partially within the second chamber and comprising a second diaphragm and a second plug, wherein the second diaphragm is configured to selectively position the second plug to control a fluid flow from the second chamber through the second chamber outlet and regulate the fluid from the intermediate pressure to an outlet pressure, and wherein the second regulator further comprises a switching diaphragm between the second chamber inlet and the second chamber outlet that is selectively deformable responsive to the intermediate pressure exceeding a predetermined threshold pressure.

Illustration 28. The fluid regulator assembly of any preceding or subsequent illustrations or combination of illustrations, wherein the first regulator further comprises a first biasing member applying a first biasing force against the first diaphragm, wherein the first diaphragm is configured to position the first plug to control a fluid flow from the first chamber to the intermediate passage through the first chamber outlet and regulate the fluid from the inlet pressure to the intermediate pressure by balancing the intermediate pressure with the first biasing force, and wherein balancing by the first diaphragm positions the first plug relative to the first chamber outlet; and the second regulator further comprises a second biasing member applying a second biasing force against the second diaphragm, wherein the second diaphragm is configured to position the second plug to control a fluid flow from the second chamber through the second chamber outlet and regulate the fluid from the intermediate pressure to the outlet pressure by balancing the outlet pressure with the second biasing force, and wherein balancing by the second diaphragm positions the second plug relative to the second chamber outlet.

Illustration 29. The fluid regulator assembly of any preceding or subsequent illustrations or combination of illustrations, wherein at least one of the first biasing member or the second biasing member is adjustable such that at least one of the first biasing force or the second biasing force is adjustable.

Illustration 30. The fluid regulator assembly of any preceding or subsequent illustrations or combination of illustrations, wherein the predetermined threshold value is greater than 6.5 kPa.

Illustration 31. The fluid regulator assembly of any preceding or subsequent illustrations or combination of illustrations, wherein the second regulator further comprises: a support; and a piston supported by the support and movable relative to the support, wherein the second plug is operable connected to the second diaphragm via the piston, and wherein the piston is configured to obstruct the second chamber outlet responsive to a failure of the piston.

Illustration 32. The fluid regulator assembly of any preceding or subsequent illustrations or combination of illustrations, wherein: the first regulator separates the first chamber into an inlet pressure region at the inlet pressure and an intermediate pressure region at the intermediate pressure less than the inlet pressure; the first diaphragm is in the intermediate pressure region of the first chamber, the first regulator comprises a passage fluidly connecting the intermediate passage with the intermediate pressure region of the first chamber, the switching diaphragm of the second regulator separates the second chamber into an intermediate pressure region at the intermediate pressure and an outlet pressure region at an outlet pressure less than the intermediate pressure; the second diaphragm is in the outlet pressure region; and the second regulator comprises a passage fluidly connecting the second chamber outlet with the outlet pressure region of the second chamber.

Illustration 33. The fluid regulator assembly of any preceding or subsequent illustrations or combination of illustrations, wherein the inlet pressure is greater than 20 kPa, wherein the intermediate pressure is from 4.0 kPa to 6.5 kPa, inclusive, and wherein the outlet pressure is less than 4.0 kPa.

Illustration 34. A fluid regulator assembly for a fluid, the fluid regulator assembly comprising: a housing comprising: a first chamber comprising a first chamber inlet and a first chamber outlet, and a second chamber comprising a second chamber inlet and a second chamber outlet, wherein the second chamber inlet is in fluid communication with the first chamber outlet; a first regulator within the first chamber and configured to separate the first chamber into an inlet pressure region at an inlet pressure and an intermediate pressure region at an intermediate pressure less than the inlet pressure, wherein the first regulator is configured to regulate the fluid from the inlet pressure to the intermediate pressure and control a fluid flow from the inlet pressure region of the first chamber to second chamber inlet based on the intermediate pressure, and a second regulator within the second chamber and configured to separate the second chamber into an intermediate pressure region at the intermediate pressure and an outlet pressure region at an outlet pressure less than the intermediate pressure, wherein the second regulator is configured to regulate the fluid from the intermediate pressure to the outlet pressure and control a fluid flow from the second chamber through the second chamber outlet based on the outlet pressure, and wherein the second regulator is configured to define a flow path from the intermediate pressure region of the second chamber to the outlet pressure region within the second chamber responsive to the intermediate pressure exceeding a predetermined threshold pressure.

Illustration 35. The fluid regulator assembly of any preceding or subsequent illustrations or combination of illustrations, wherein the second regulator comprises: a diaphragm within the outlet pressure region; a biasing member applying a biasing force against the diaphragm; and a plug operably connected to the diaphragm, wherein the diaphragm is configured to regulate the fluid from the intermediate pressure to the outlet pressure and control a fluid flow from the chamber through the second chamber outlet by balancing the outlet pressure with the biasing force, and wherein balancing by the diaphragm positions the plug relative to the second chamber outlet.

Illustration 36. The fluid regulator assembly of any preceding or subsequent illustrations or combination of illustrations, wherein the second regulator further comprises a switching diaphragm within the second chamber and separating the intermediate pressure region from the outlet pressure region, wherein the switching diaphragm is selectively deformable such that the flow path from the inlet pressure region to the outlet pressure region is selectively defined by the second regulator.

Illustration 37. The fluid regulator assembly of any preceding or subsequent illustrations or combination of illustrations, wherein the second regulator further comprises: a support; and a piston supported by the support and movable relative to the support, wherein the plug is operable connected to the diaphragm via the piston, and wherein the piston is configured to obstruct the second chamber outlet responsive to a failure of the piston.

Illustration 38. The fluid regulator assembly of any preceding or subsequent illustrations or combination of illustrations, wherein the second regulator further comprises a support; a piston supported by the support and movable relative to the support; a first diaphragm connected to the piston and configured to position the piston relative to the support; and a second diaphragm connected to the support and separating the intermediate pressure region from the outlet pressure region, wherein the second diaphragm is selectively deformable responsive to the intermediate pressure exceeding the predetermined threshold pressure, and wherein deformation of the second diaphragm defines the flow path from the inlet pressure region to the outlet pressure region within the chamber.

Illustration 39. The fluid regulator assembly of any preceding or subsequent illustrations or combination of illustrations, wherein the inlet pressure is greater than 20 kPa, wherein the intermediate pressure is from 4.0 kPa to 6.5 kPa, inclusive, and wherein the outlet pressure is less than 4.0 kPa.

Illustration 40. The fluid regulator assembly of any preceding or subsequent illustrations or combination of illustrations, wherein the predetermined threshold pressure is 7.0 kPa.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A method of controlling a fluid pressure of a fluid with a fluid regulator assembly, the method comprising:

under normal conditions:

receiving at an inlet of the fluid regulator assembly the fluid at an inlet fluid pressure;

reducing the inlet fluid pressure using a first control mechanism such that the fluid is at an intermediate fluid pressure; and reducing the intermediate fluid pressure using a second control mechanism such that the fluid at an outlet of the fluid regulator assembly is at an outlet fluid pressure;

wherein the method further comprises:

responsive to a failure by the second control mechanism, controlling, by the first control mechanism, the fluid to be at the intermediate fluid pressure at the outlet of the fluid regulator assembly; and responsive to a failure by the first control mechanism, closing, by the second control mechanism, the outlet of the fluid regulator assembly, wherein closing the outlet by the second control mechanism comprises deforming a control element such that the fluid at the inlet fluid pressure acts on a balancing diaphragm of the fluid regulator assembly.

2. The method of claim 1, further comprising venting the fluid from a housing using a relief valve based on the intermediate fluid pressure exceeding 6 kPa.

3. The method of claim 2, wherein venting the fluid comprises venting the fluid based on the intermediate fluid pressure exceeding 7 kPa.

4. The method of claim 1, wherein the intermediate fluid pressure is less than 7 kPa, and wherein the outlet fluid pressure is less than 4 kPa.

5. The method of claim 4, wherein the outlet fluid pressure is less than 3 kPa.

6. A method of controlling a fluid from a fluid regulator assembly, the method comprising:

providing the fluid regulator assembly comprising a housing, a first control mechanism within the housing, and a second control mechanism within the housing, wherein the first control mechanism is configured to reduce a fluid pressure of the fluid from an inlet fluid pressure to an intermediate fluid pressure, and wherein the second control mechanism is configured to reduce the fluid pressure of the fluid from the intermediate fluid pressure to an outlet fluid pressure;

responsive to a failure of the second control mechanism, controlling, by the first control mechanism, the fluid such that the fluid pressure at the outlet of the housing is at the intermediate fluid pressure; and responsive to a failure of the first control mechanism, closing, by the second control mechanism, the outlet of the housing, wherein the second control mechanism comprises a deformable control element and a balancing diaphragm, wherein the deformable control element is configured to control the fluid acting on the balancing diaphragm.

7. The method of claim 6, further comprising venting the fluid from the housing using a relief valve based on the intermediate fluid pressure exceeding 6 kPa.

8. The method of claim 7, wherein venting the fluid comprises venting the fluid based on the intermediate fluid pressure exceeding 7 kPa.

9. The method of claim 6, wherein the intermediate fluid pressure is less than 7 kPa, and wherein the outlet fluid pressure is less than 4 kPa.

10. The method of claim 9, wherein the outlet fluid pressure is less than 3 kPa.

11. The method of claim 6, wherein closing the outlet by the second control mechanism comprises deforming the control element such that the fluid at the inlet fluid pressure acts on a balancing diaphragm of the fluid regulator assembly.

12. A fluid regulator assembly for a fluid, the fluid regulator assembly comprising:

a housing comprising an inlet and an outlet, wherein the housing is configured to receive the fluid having an inlet fluid pressure at the inlet;

a first control mechanism within the housing configured to control the fluid such that the inlet fluid pressure is reduced to an intermediate fluid pressure; and a second control mechanism within the housing and configured to control the fluid such that the intermediate fluid pressure is reduced to an outlet fluid pressure, wherein, responsive to a failure of the second control mechanism, the first control mechanism is configured to control the fluid such that the fluid at the outlet is at the intermediate fluid pressure, and wherein, responsive to a failure of the first control mechanism, the second control mechanism is configured to close the outlet, wherein the second control mechanism comprises a deformable control element and a balancing diaphragm, wherein the deformable control element is configured to control the fluid acting on the balancing diaphragm.

13. The fluid regulator assembly of claim 12, wherein the intermediate pressure is less than or equal to 7 kPa, and wherein the outlet fluid pressure is less than 4 kPa.

14. The fluid regulator assembly of claim 12, further comprising a relief valve configured to vent the fluid from the fluid regulator assembly based on the intermediate fluid pressure exceeding 6 kPa.

15. The fluid regulator assembly of claim 14, wherein the relief valve is configured to vent the fluid based on the intermediate fluid pressure exceeding 7 kPa.

16. The fluid regulator assembly of claim 12, wherein the deformable control element is configured deform responsive to the failure of the first control mechanism such that the fluid at the inlet fluid pressure acts on the balancing diaphragm.

17. The fluid regulator assembly of claim 12, wherein:

the housing comprises a first chamber, a second chamber, and an intermediate passage connecting the first chamber and the second chamber;

the first control mechanism is in the first chamber and comprises a first plug and a first diaphragm operably coupled to the first plug, wherein the first diaphragm is configured to position the first plug; and a second regulator is in the second chamber and comprises a second plug, a second diaphragm operably connected to the second plug, and a control element, wherein the second diaphragm is configured to position the second plug, and wherein the control element is configured to control the fluid acting on the second diaphragm to be the fluid at the outlet fluid pressure or the fluid at the inlet fluid pressure.

* * * * *